United States Patent
Vasseur et al.

(10) Patent No.: US 12,160,364 B1
(45) Date of Patent: Dec. 3, 2024

(54) SYSTEMS AND METHODS FOR INTERNET-OF-THINGS NETWORK PREDICTIVE TOPOLOGY SWITCHING

(71) Applicant: Cisco Technology, Inc., San Jose, CA (US)

(72) Inventors: JP Vasseur, Saint Martin d'Uriage (FR); Pascal Thubert, Roquefort les Pins (FR); Eric Levy-Abegnoli, Valbonne (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/351,259

(22) Filed: Jul. 12, 2023

(51) Int. Cl.
 G06F 15/16 (2006.01)
 H04L 45/00 (2022.01)
 H04L 45/02 (2022.01)
 H04L 45/12 (2022.01)
 H04L 45/302 (2022.01)

(52) U.S. Cl.
 CPC .......... H04L 45/302 (2013.01); H04L 45/08 (2013.01); H04L 45/123 (2013.01); H04L 45/38 (2013.01)

(58) Field of Classification Search
 CPC ........ H04L 45/302; H04L 45/08; H04L 45/38
 See application file for complete search history.

(56) References Cited

U.S. PATENT DOCUMENTS

| | | | | |
|---|---|---|---|---|
| 2012/0113863 A1* | 5/2012 | Vasseur | ................. | H04W 84/18 370/254 |
| 2013/0219046 A1* | 8/2013 | Wetterwald | ............. | H04L 45/38 709/224 |
| 2013/0223218 A1* | 8/2013 | Vasseur | ................... | H04L 45/38 370/232 |
| 2015/0195149 A1* | 7/2015 | Vasseur | ............... | H04L 47/2425 370/252 |
| 2015/0281004 A1* | 10/2015 | Kakadia | .............. | H04L 41/5025 370/235 |
| 2015/0319077 A1* | 11/2015 | Vasseur | ................... | H04L 45/44 370/238 |
| 2017/0099226 A1* | 4/2017 | Vasseur | ................. | H04L 47/826 |
| 2023/0403600 A1* | 12/2023 | Boukhtouta | ............ | H04L 45/00 |

FOREIGN PATENT DOCUMENTS

WO    2022084952    4/2022

OTHER PUBLICATIONS

Thubert et al., Root initiated routing state in RPL, Jul. 4, 2023, 78 pages (Year: 2023).*
Bhandari K.S., et al., "Multi-Topology Based QoS-Differentiation in RPL for Internet of Things Applications", IEEE Access, May 20, 2020, vol. 8, pp. 1-20.

* cited by examiner

*Primary Examiner* — Hieu T Hoang
(74) *Attorney, Agent, or Firm* — Polsinelli P.C.

(57) ABSTRACT

Systems, methods and computer-readable storage media are provided for determining critical flow characteristics and predicting the network resources to compute time-based p-routes that satisfy different SLAs. Critical flows within a set of nodes organized in a DODAG are monitored and assessed according to applicable SLAs and relevant networking KPIs to generate a forecast of the traffic flow and the overall SLAs for these critical flows. These overall SLAs, KPIs, and the generated forecast are used by a PCE associated with the network to compute p-routes through the set of nodes in the DODAG that satisfy the overall SLAs for the critical flows.

18 Claims, 8 Drawing Sheets

SYSTEMS AND METHODS FOR INTERNET-OF-THINGS NETWORK PREDICTIVE TOPOLOGY SWITCHING

TECHNICAL FIELD

The present disclosure generally relates to the field of computer networking, particularly with regard to the determination of critical flow characteristics and to the prediction of network resources for an Internet-of-Things (IoT) network for the computation of time-based p-routes that satisfy different service-level agreements (SLAs).

BACKGROUND

The Routing Protocol for Low Power and Lossy Networks (RPL) is a generic distance vector protocol that is often used in a variety of low energy IoT network. RPL may be used to form Destination Oriented Directed Acyclic Graphs (DODAGs) within which a root node may act as the border router to connect the RPL domain to an external communications network, such as the Internet. This root node may be responsible for selecting the RPL instance that is used to forward data packets from the Internet into the RPL domain and to set the related RPL information into these data packets.

The Internet Protocol version 6 (IPv6) over the Time-Slotted Channel Hopping (6TiSCH) mode may use RPL for its routing operations and may be one of the possible modes for Reliable and Available Wireless (RAW). The RAW architecture may further leverage the Deterministic Networking (DetNet) architecture centralized model (defined in the Internet Engineering Task Force (IETF) Request for Comments (RFC) 8655, hereby incorporated into the present disclosure by reference), whereby the device resources and capabilities are exposed to an external controller which installs routing states into the IoT network based on objective functions that reside in the controller. The component of the controller that is responsible for computing routes within the IoT network is defined as the Path Computation Element (PCE). The PCE may rely on heuristics corresponding to usage, path length, and knowledge of device capacity and available resources to compute peer-to-peer (P2P) routes that are optimized for the needs expressed by an objective function.

Recent advances in Destination Advertisement Object (DAO) technology provide for protocol extensions to RPL that enable the root node of a DODAG to install centrally-computed routes inside the DODAG on behalf of the PCE. The underlying RPL instance may be operated in RPL non-storing mode of operation (MOP) to sustain the exchanged with the root node. In this mode, the root node may have enough information to build a basic DODAG topology based on parents and children nodes, but would lack knowledge regarding sibling nodes. The centrally-located routes, or projected routes (p-routes), can be used to reduce the size of the source routing headers with loose source routing operations down the main RPL DODAG. Projected routes may be further used to build transversal routes for route optimization and traffic engineering purposes, between nodes of the DODAG.

The p-routes can be used to shortcut the RPL DODAG and optimize network paths. However, because the nodes within the DODAG have limited capacity, these nodes can only host a limited number of p-routes, thereby requiring the host node to use these p-routes in an efficient manner. Further, identifying the optimal p-routes for the DODAG may depend on the network utilization at each point in time. Accordingly, it may be difficult to continuously determine the optimal p-routes, which may change over time.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
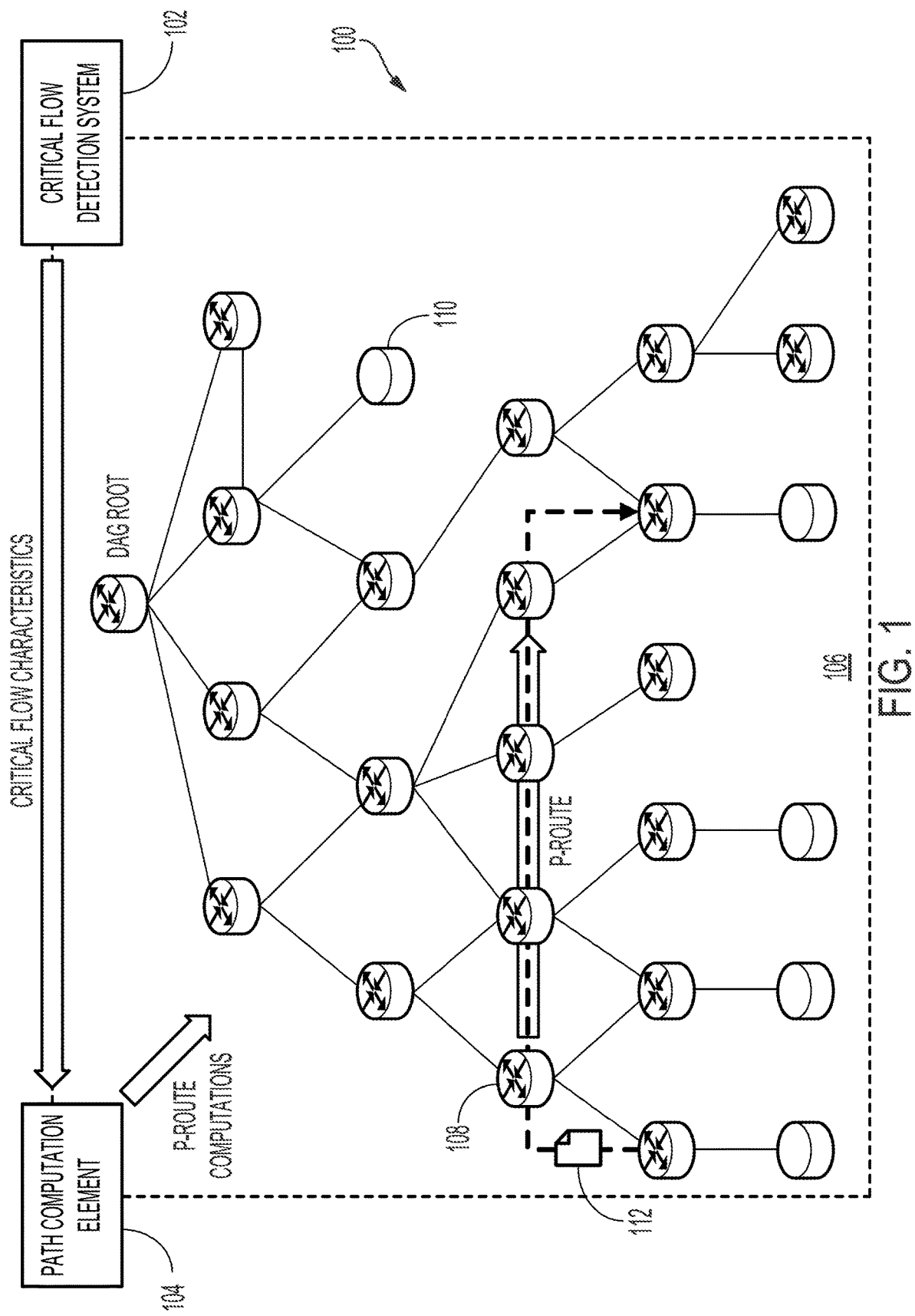
FIG. 1 shows an illustrative example of an environment in which a PCE computes one or more p-routes based on critical flow characteristics and forecasts generated by a critical flow detection system in accordance with at least one embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for determining critical flow characteristics and predicting the network resources to compute time-based p-routes that satisfy different SLAs.

In an example, a computer-implemented method comprises monitoring a set of critical flows within a set of nodes. The set of nodes are organized along a DODAG. Further, the set of critical flows are used to identify a flow of interest transiting through the DODAG. The computer-implemented method further comprises assessing a SLA corresponding to the flow of interest. The SLA is assessed based on networking KPIs. The computer-implemented method further comprises generating a forecast of a traffic flow corresponding to the flow of interest. The forecast of the traffic flow and the SLA are used to define a critical flow characteristic corresponding to the flow of interest. The computer-implemented method further comprises providing the critical flow characteristic. When the critical flow characteristic is used by a PCE associated with the set of nodes, the PCE uses the critical flow characteristic to compute a p-route through the set of nodes that satisfies the SLA for the flow of interest.

In an example, the computer-implemented method further comprises training a machine learning algorithm to generate the forecast of the traffic flow. The machine learning algorithm is trained using a dataset of sample critical flows, sample forecasts corresponding to the sample critical flows, and sample p-routes.

In an example, the computer-implemented method further comprises monitoring the p-route to generate a determination corresponding to whether the p-route satisfies the SLA for the flow of interest. The computer-implemented method further comprises providing feedback with regard to the p-route based on the determination.

In an example, the computer-implemented method further comprises applying a set of filters along the DODAG to perform deep packet inspection (DPI), wherein the DPI is performed to identify the flow of interest.

In an example, the KPIs include a maximum delay and an end-to-end loss amongst the set of nodes.

In an example, the p-route is time-based according to a schedule. Further, the schedule is computed according to the critical flow characteristic.

In an example, the SLA is further assessed using a set of SLA templates based on one or more thresholds corresponding to the networking KPIs.

In an example, a system comprises one or more processors and memory storing thereon instructions that, as a result of being executed by the one or more processors, cause the system to monitor a set of critical flows within a set of nodes. The set of nodes are organized along a DODAG. Further, the set of critical flows are used to identify a flow of interest transiting through the DODAG. The instructions further cause the system to assess a SLA corresponding to the flow of interest. The SLA is assessed based on networking KPIs. The instructions further cause the system to generate a forecast of a traffic flow corresponding to the flow of interest. The forecast of the traffic flow and the SLA are used to define a critical flow characteristic corresponding to the flow of interest. The instructions further cause the system to provide the critical flow characteristic. When the critical flow characteristic is used by a PCE associated with the set of nodes, the PCE uses the critical flow characteristic to compute a p-route through the set of nodes that satisfies the SLA for the flow of interest.

In an example, a non-transitory computer-readable storage medium stores thereon executable instructions that, as a result of being executed by one or more processors of a computer system, cause the computer system to monitor a set of critical flows within a set of nodes. The set of nodes are organized along a DODAG. Further, the set of critical flows are used to identify a flow of interest transiting through the DODAG. The executable instructions further cause the computer system to assess a SLA corresponding to the flow of interest. The SLA is assessed based on networking KPIs. The executable instructions further cause the computer system to generate a forecast of a traffic flow corresponding to the flow of interest. The forecast of the traffic flow and the SLA are used to define a critical flow characteristic corresponding to the flow of interest. The executable instructions further cause the computer system to provide the critical flow characteristic. When the critical flow characteristic is used by a PCE associated with the set of nodes, the PCE uses the critical flow characteristic to compute a p-route through the set of nodes that satisfies the SLA for the flow of interest.

Description of Example Embodiments

Figure 7:
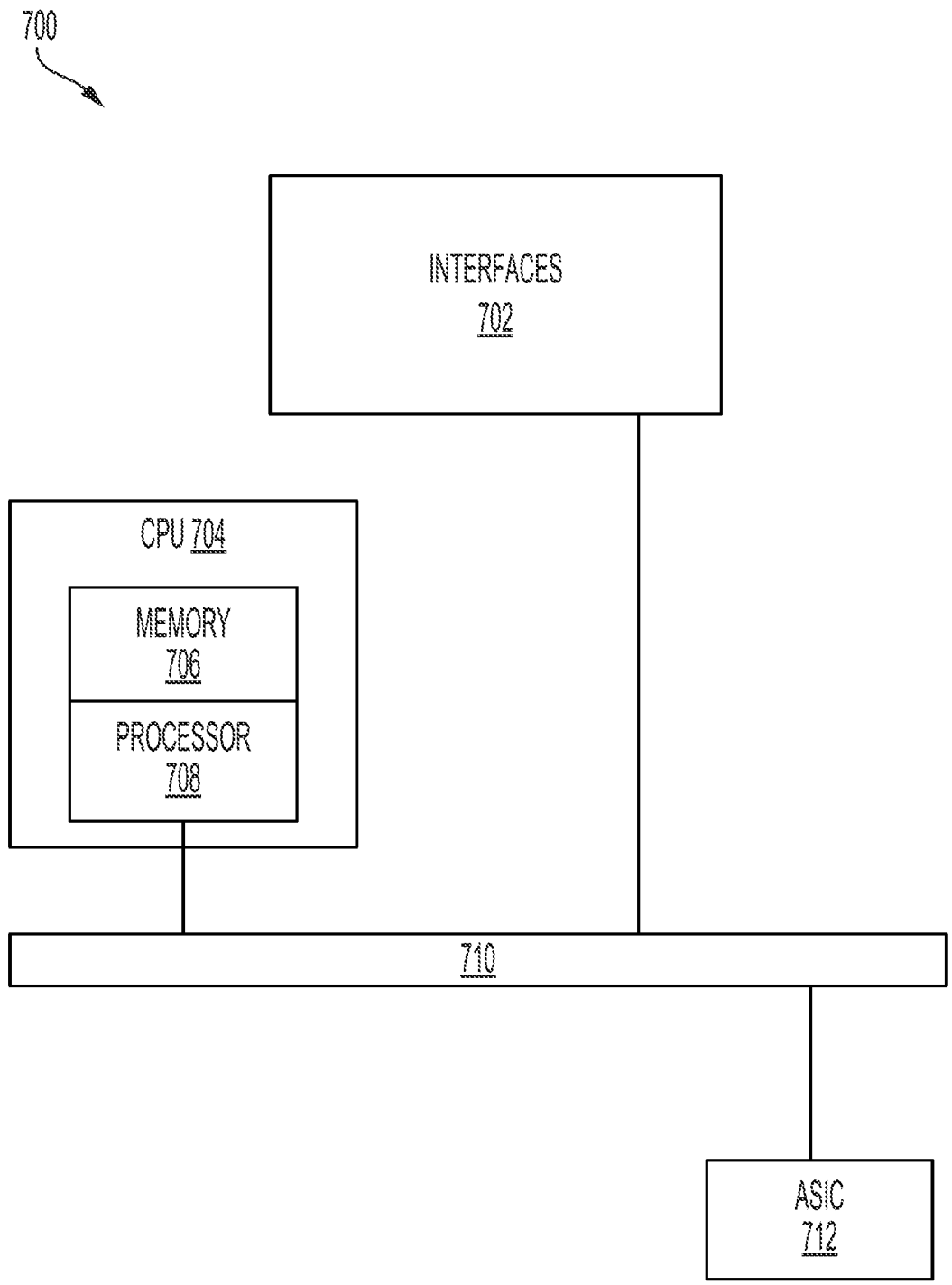
FIG. 7 illustrates an example network device suitable for performing switching, routing, and other networking operations in accordance with some embodiments.
Figure 8:
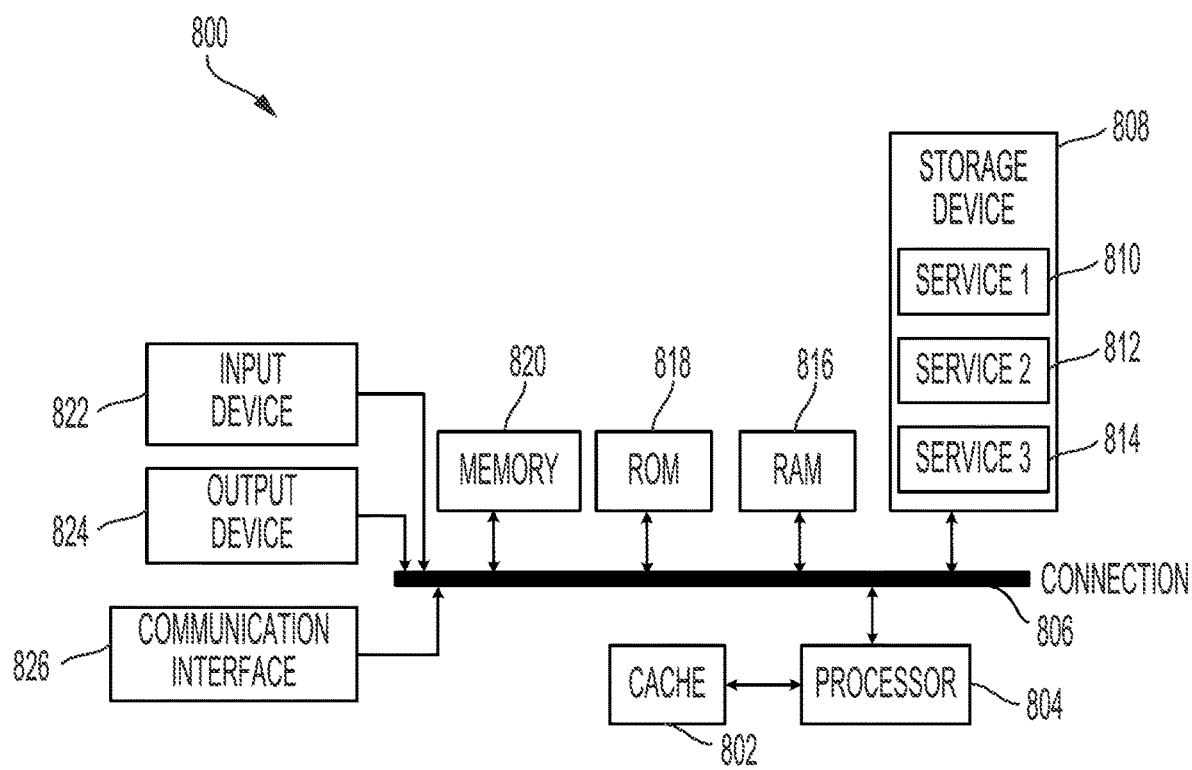
FIG. 8 illustrates a computing system architecture including various components in electrical communication with each other using a connection in accordance with some embodiments.

Disclosed herein are systems, methods and computer-readable storage media for determining critical flow characteristics and predicting the network resources to compute time-based p-routes matching different SLAs. The present technologies will be described in more detail in the following disclosure as follows. The discussion begins with a detailed description of example systems, processes and environments for performing the aforementioned determinations and predictions, as illustrated in FIGS. 1 through 6. The discussion concludes with a description of an example network and computing devices, as illustrated in FIGS. 7 and 8.

FIG. 1 shows an illustrative example of an environment 100 in which a PCE 104 computes one or more p-routes based on critical flow characteristics and forecasts generated by a critical flow detection system 102 in accordance with at least one embodiment. In the environment 100, a Low Power and Lossy Network (LLN) 106 is provided, which includes a set of LLN routers 108 and endpoints 110. The LLN routers 108 and endpoints 110 may include myriad IoT devices or other constrained devices that operate subject to different constraints on processing power, memory, and have limited power resources (e.g., battery capacity, etc.).

In an embodiment, the myriad LLN routers 108 and endpoints 110 within the LLN 106 may be organized into one or more DODAGs according to the Routing Protocol for LLNs (RPL). Within a DODAG generated using RPL, a root node (e.g., the DAG root node) may act as the border router to connect the RPL domain (e.g., the LLN 106 organized into a DODAG, as illustrated in FIG. 1) to an external communications network, such as the Internet. The DAG root node may be responsible for selecting the RPL instance that is used to forward data packets from external communications networks into the RPL domain and for setting the related RPL information in these data packets.

In an embodiment, the device resources and capabilities of the myriad LLN routers 108 and endpoints 110 are exposed to the PCE 104, which installs routing states into the LLN 106 based on objective functions maintained by the PCE 104. The PCE 104 maintains information corresponding to the LLN 106, including the various path lengths within the corresponding DODAGs and between different LLN routers 108 and endpoints 110, the device capacity and available resources (e.g., battery levels, reservable buffers, etc.), and heuristics corresponding to usage of these LLN routers 108 and endpoints 110. Based on this information, the PCE 104 can compute direct P2P routes that are optimized for the needs expressed in corresponding objective functions.

In an embodiment, in addition to computing these direct P2P routes, the PCE 104 can further compute p-routes within the LLN 106 for different network flows. These p-routes may be used to reduce the size of the source routing headers with loose source routing operations down the main RPL DODAG. These p-routes may also be used to build transversal routes for route optimization and traffic engineering purposes between nodes of the DODAG. A p-route defined by the PCE 104 may serve as a traffic engineered route that can form the basis of an RPL topology on top of the DODAG that acts an underlay in the DODAG fabric. Thus, a p-route can be used to shortcut the RPL DODAG and to optimize certain network paths within the LLN 106.

As noted above, the LLN routers 108 and endpoints 110 within the LLN 106 may have limited resources and capabilities. As such, these LLN routers 108 and endpoints 110 may be limited in the number of p-routes that they are able to host at any given time. As network utilization and traffic may be dynamic (e.g., constantly changing over time), the p-routes defined by the PCE 104 may need to be dynamically changed in order to provide optimal transversal routes within the LLN 106 at any given time and to satisfy any applicable SLAs for the LLN 106.

In an embodiment, the PCE 104 interacts with a critical flow detection system 102 to obtain critical flow characteristics usable to dynamically define p-routes for the LLN 106 that satisfy the applicable SLAs for the LLN 106. In an embodiment, the critical flow detection system 102 automatically monitors network traffic flows within the LLN 106 to identify critical flows or other flows of interest that may be transiting through the DODAG. For instance, the critical flow detection system 102 may implement a set of filters along the DODAG to perform deep packet inspection (DPI) of data packets transiting the LLN 106 through different LLN routers 108 and endpoints 110. The implementation of this set of filters along the DODAG may allow the critical flow detection system 102 to collect statistical data and have increased visibility into the network traffic within the LLN 106 over time. In an embodiment, this statistical data can be processed by the critical flow detection system 102 to dynamically identify any network traffic patterns within the LLN 106. These patterns may be used to identify the critical flows or other flows of interest for which p-routes may be defined, as described in greater detail herein.

In an embodiment, the critical flow detection system 102 processes any obtained statistical data and identified network traffic patterns corresponding to the critical flows or other flows of interest to assess the SLA for each of these critical flows or other flows of interest. For instance, the critical flow detection system 102, in response to obtaining this statistical data and identified network traffic patterns, may use known SLA templates for the LLN 106 to assess these SLAs according to pre-defined thresholds on networking key performance indicators (KPIs). For instance, using these known SLA templates, the critical flow detection system 102 may compute the maximum delay, end-to-end loss (as computed using per-hop statistics gathered from the set of visited nodes between sources and destinations), and the like. Through the calculation of these KPIs using the obtained statistical data for these critical flows or other flows of interest and the known SLA templates for the LLN 106, the critical flow detection system 102 may compute the overall SLAs for these critical flows or other flows of interest.

In an embodiment, the critical flow detection system 102 implements a machine learning algorithm or artificial intelligence to further forecast the traffic flow for these critical flows or other flows of interest. For instance, the critical flow detection system 102 may dynamically train an Autoregressive Integrated Moving Average (ARIMA) model using a training dataset comprising historical time series data (e.g., actual time series data corresponding to different traffic flows), hypothetical time series data (e.g., artificial time series data generated exclusively for model training purposes), or combination thereof. The training dataset may further include, for each set of time series data, may include the known subsequent result (e.g., later time series data for the subject flow) that may serve as the ground truth for any forecasts generated by the ARIMA model. Thus, through processing of the training dataset using the ARIMA model, the critical flow detection system 102 may evaluate any generated forecasts against the known results corresponding to the training dataset to determine whether the ARIMA model is generating accurate forecasts. Based on this determination, the critical flow detection system 102 may dynamically update the ARIMA model to improve its accuracy in generating traffic flow forecasts for the identified critical flows or other flows of interest. It should be noted that while ARIMA models are used extensively throughout the present disclosure for the purpose of illustration, other machine learning algorithms or artificial intelligence may be implemented to generate traffic flow forecasts according to obtained time series data for critical flows or other flows of interest. For instance, the critical flow detection system 102 may dynamically train and implement a recurrent neural network (RNN) (such as long short-term memory (LSTM) networks, etc.) or a convolutional neural network (CNN) to predict the future time-series data for a given critical flow or other flow of interest.

In an embodiment, the machine learning algorithm or artificial intelligence implemented by the critical flow detection system 102 can be further trained dynamically in real-time as new time-series data is obtained for the critical flows or other flows of interest. For instance, as new time-series data is received for different critical flows or other flows of interest associated with the LLN 106, the critical flow detection system 102 may evaluate this time-series data against any previously generated traffic flow forecasts generated by the machine learning algorithm or artificial intelligence to determine the accuracy of these forecasts. Based on this evaluation, the critical flow detection system 102 may update the training dataset and use this training dataset to improve the accuracy of the machine learning algorithm or artificial intelligence in generating network traffic time-series forecasts.

In some instances, the critical flow detection system 102 may use signal seasonal decomposition to assess whether the traffic profiles corresponding to the critical flows or other flows of interest are seasonal. Further, in an embodiment, the critical flow detection system 102 can determine whether the SLA for a critical flow or other flow of interest using a default path is also seasonal. Based on these determinations, the critical flow detection system 102 may further refine the forecasts generated by the machine learning algorithm or artificial intelligence for the critical flows or other flows of interest.

In an embodiment, using these time-series forecasts and/or the overall SLA for each critical flow or other flow of interest, the critical flow detection system 102 can define a critical flow characteristic for each of these critical flows or other flows of interest. A critical flow characteristic for a particular critical flow or other flow of interest may be provided by the critical flow detection system 102 to the PCE 104 to allow the PCE 104 to compute a p-route for the critical flow or other flow of interest that would satisfy the corresponding SLA for this critical flow or other flow of interest. In response to obtaining this critical flow characteristic, the PCE 104 may perform a trial-and-error process whereby the PCE 104 may attempt to find a better path for the critical flow or other flow of interest according to the provided time-series forecast (as defined through the critical flow characteristic). In an embodiment, the PCE 104 can forecast the network resources required for the critical flow or other flow of interest. This forecast may be used to identify a p-route that would satisfy the PCE flow requirements for the critical flow or flow of interest. In an embodiment, the PCE 104 implements a machine learning algorithm or artificial intelligence (e.g., Graphical Neural Networks (GNNs), RNNs, CNNs, etc.) to predict the network resources required for the critical flow or other flow of interest and, based on this prediction, compute p-routes for the critical flow or other flow of interest.

In an embodiment, the p-routes computed by the PCE 104 are time-based according to the schedule defined by the PCE 104 based on the received critical flow characteristics for each critical flow or other flow of interest. These p-routes may be provided to the LLN routers 108 and endpoints 110 within the LLN 106 according to the PCE 106 or pre-loaded onto all LLN nodes within the LLN 106.

As noted above, the critical flow detection system 102 may continuously evaluate new time-series data for different critical flows and other flows of interest to determine whether the machine learning algorithm or artificial intelligence implemented by the critical flow detection system 102 has accurately forecast the network traffic flows over time for these different critical flows and other flows of interest. For example, in an embodiment, the critical flow detection system 102 can monitor the SLA for each of these critical flows or other flows of interest following the time-based p-routes computed by the PCE 104 in order to determine whether these p-routes satisfy the corresponding SLA requirements. This monitoring may be used to signal back to the PCE 104 whether such p-routes do indeed satisfy the corresponding SLA requirements. Further, through this monitoring, the critical flow detection system 102 may update the training data used to dynamically train and update the machine learning algorithm or artificial intelligence implemented to generate time-series forecasts used by the PCE 104 to compute these p-routes.

Figure 2:
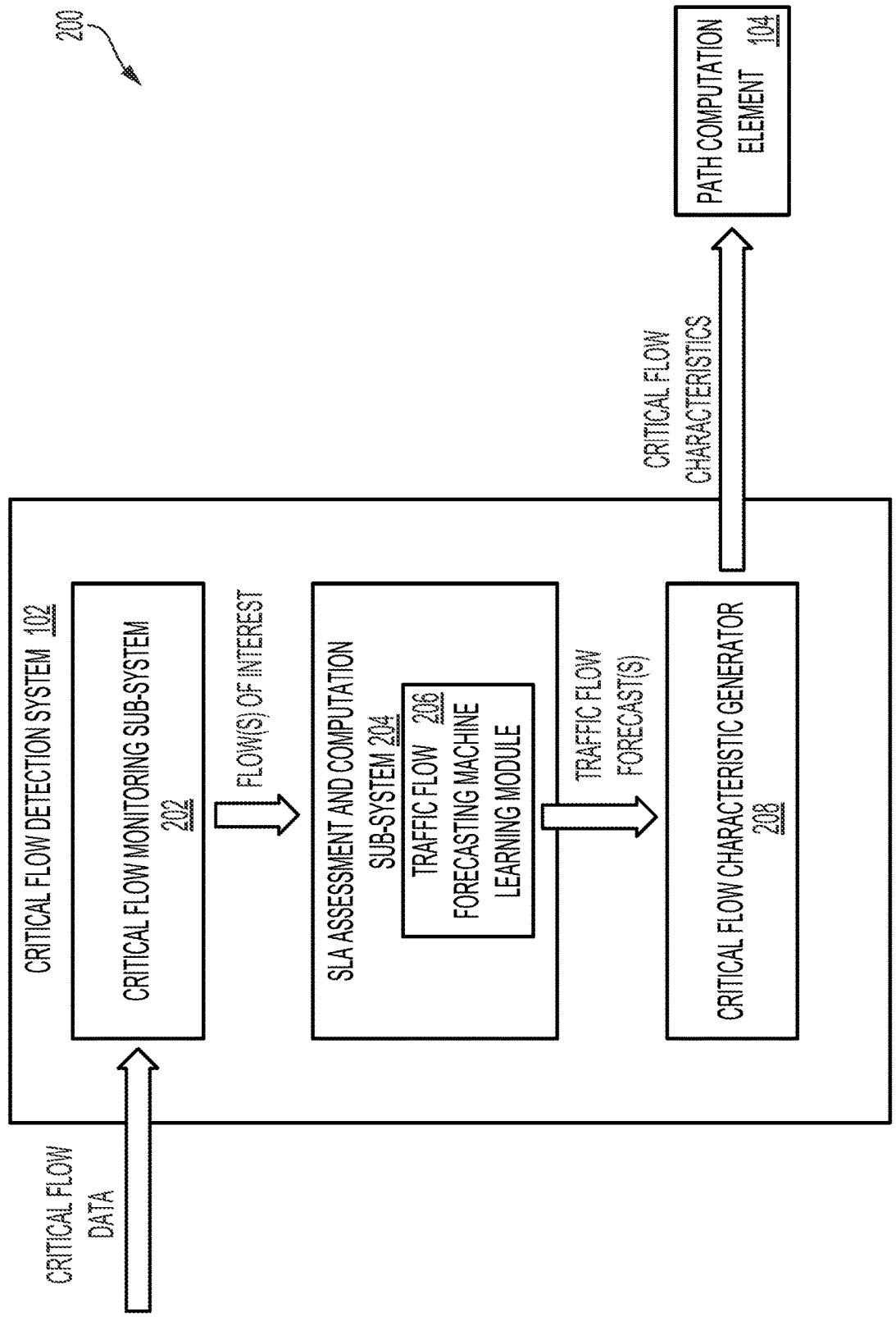
FIG. 2 shows an illustrative example of an environment in which a critical flow detection system processes data corresponding to different critical flows within a Low Power and Lossy Network (LLN) to generate critical flow characteristics and flow forecasts for different flows of interest in accordance with at least one embodiment.

FIG. 2 shows an illustrative example of an environment 200 in which a critical flow detection system 102 processes data corresponding to different critical flows within a LLN to generate critical flow characteristics and flow forecasts for different flows of interest in accordance with at least one embodiment. As noted above, a PCE 104 associated with a LLN may interact with the critical flow detection system 102 to obtain critical flow characteristics usable to dynamically define p-routes for the LLN that satisfy the applicable SLAs for the LLN. In an embodiment, the critical flow detection system 102 implements a set of components that, collectively, are used to dynamically generate these critical flow characteristics based on critical flow data obtained through monitoring of the LLN. For instance, as illustrated in FIG. 2, the critical flow detection system 102 may implement a critical flow monitoring sub-system 202. The critical flow monitoring sub-system 202, in an embodiment, implements a set of filters along the DODAG of the LLN to perform DPI of data packets transiting the LLN through different nodes within the LLN. Through the implementation of this set of filters along the DODAG, the critical flow monitoring sub-system 202 may collect statistical data corresponding to different network traffic flows within the LLN. In an embodiment, the critical flow monitoring sub-system 202 may dynamically process this statistical data to identify any network traffic patterns within the LLN that may be used to identify any critical flows or other flows of interest that may be evaluated further to generate p-routes for the LLN.

As the critical flow monitoring sub-system 202 identifies the network traffic patterns corresponding to different critical flows or other flows of interest, the critical flow monitoring sub-system 202 may provide these network traffic patterns (e.g., time-series data, etc.) for the identified critical flows or other flows of interest to a SLA assessment and computation sub-system 204 implemented by the critical flow detection system 102. In an embodiment, the SLA assessment and computation sub-system 204 may process the obtained statistical data (including the network traffic patterns and corresponding time-series data) for the identified critical flows or other flows of interest to assess the SLA for each of these critical flows or other flows of interest. In an embodiment, the SLA assessment and computation sub-system 204 uses known SLA templates for the LLN to assess these SLAs according to pre-defined thresholds on networking KPIs. The SLA assessment and computation sub-system 204 may, for instance, using the obtained statistical data to calculate the KPIs and, based on these KPIs, compute the overall SLAs for the identified critical flows or other flows of interest.

In an embodiment, the SLA assessment and computation sub-system 204 implements a traffic flow forecasting machine learning module 206 that may be used to forecast the traffic flow for the identified critical flows or other flows of interest over time. The traffic flow forecasting machine learning module 206 may include a machine learning algorithm or artificial intelligence that is dynamically trained to generate these network traffic flow forecasts for identified critical flows or other flows of interest. As noted above, the machine learning algorithm or artificial intelligence may include an ARIMA model that is trained using a training dataset comprising historical time series data for different network flows, hypothetical time series data for different network flows, or a combination thereof. The training dataset may further include, for each set of time series data, the known subsequent result (e.g., later time series data for the subject flow) that may serve as the ground truth for any forecasts generated by the ARIMA model. Through this processing of the training dataset, the ARIMA model implemented in the traffic flow forecasting machine learning module 206 may be evaluated to determine whether the generated forecasts comport with the known results corresponding to the training dataset. Based on this evaluation, the SLA assessment and computation sub-system 204 may dynamically update the ARIMA model to improve the accuracy of the ARIMA model in generating forecasts given statistical data, network traffic flow patterns, and other time-series data corresponding to critical flows and other flows of interest. As noted above, it should be noted that while ARIMA models are used extensively throughout the present disclosure for the purpose of illustration, other machine learning algorithms or artificial intelligence may be implemented by the traffic flow forecasting machine learning module 206 to generate traffic flow forecasts according to obtained time series data for critical flows or other flows of interest. For instance, the traffic flow forecasting machine learning module 206 may implement RNNs, CNNs, GNNs, and/or other machine learning algorithms or artificial intelligence to predict the future time-series data for a given critical flow or other flow of interest.

The machine learning algorithm or artificial intelligence implemented in the traffic flow forecasting machine learning module 206 may also be updated as new time-series data is obtained from the critical flow monitoring sub-system 202 for these critical flows or other flows of interest. For instance, the SLA assessment and computation sub-system 204 may evaluate this new time-series data as it is received from the critical flow monitoring sub-system 202 against any previously generated traffic flow forecasts corresponding to the relevant time periods to determine the accuracy of these forecasts generated by the traffic flow forecasting machine learning module 206 using the machine learning algorithm or artificial intelligence. Based on this evaluation, the SLA assessment and computation sub-system 204 may update the training dataset and, through the traffic flow forecasting machine learning module 206, use this training dataset to improve the accuracy of the machine learning algorithm or artificial intelligence in generating network traffic time-series forecasts.

The SLA assessment and computation sub-system 204 may further use signal seasonal decomposition to assess whether the network traffic flow profiles corresponding to the identified critical flows or other flows of interest are seasonal in nature. Additionally, the SLA assessment and computation sub-system 204 may determine whether the SLA for each critical flow or other flow of interest using a default path is also seasonal. Based on these determinations, the SLA assessment and computation sub-system 204 may further refine the forecasts generated by the traffic flow forecasting machine learning module 206 for the critical flows or other flows of interest. In some instances, based on these determinations, the SLA assessment and computation sub-system 204 may update the machine learning algorithm or artificial intelligence implemented in the traffic flow forecasting machine learning module 206 to improve the accuracy of the machine learning algorithm or artificial intelligence in generating time-series forecasts for the different critical flows or other flows of interest.

The SLA assessment and computation sub-system 204 may transmit the time-series forecasts for the different critical flows or other flows of interest to a critical flow characteristic generator 208 implemented by the critical flow detection system 102. The critical flow characteristic generator 208 may use these time-series forecasts and/or the overall SLA for each critical flow or other flow of interest to define a critical flow characteristic for each of these critical flows or other flows of interest. The critical flow characteristic generator 208 may provide the critical flow characteristic for a particular critical flow or other flow of interest to the PCE 104 to allow the PCE 104 to compute a p-route for the critical flow or other flow of interest that would satisfy the corresponding SLA for this critical flow or other flow of interest. As noted above, in response to obtaining this critical flow characteristic, the PCE 104 may perform a trial-and-error process whereby the PCE 104 may attempt to find a better path for the critical flow or other flow of interest according to the provided time-series forecast (as defined through the critical flow characteristic). The PCE 104 may forecast the network resources required for the critical flow or other flow of interest. This forecast may be used to identify a p-route that would satisfy the PCE flow requirements for the critical flow or flow of interest. In an embodiment, the PCE 104 implements a machine learning algorithm or artificial intelligence to predict the network resources required for the critical flow or other flow of interest and, based on this prediction, compute p-routes for the critical flow or other flow of interest.

In an embodiment, as the critical flow monitoring sub-system 202 receives new time-series data corresponding to these critical flows or other flows of interest, the SLA assessment and computation sub-system 204 can evaluate the previously generated time-series forecasts for these critical flows or other flows of interest to determine whether these forecasts were accurate. For example, the SLA assessment and computation sub-system 204 can monitor the SLA for each of these critical flows or other flows of interest following the time-based p-routes computed by the PCE 104 in order to determine whether these p-routes satisfy the corresponding SLA requirements. This monitoring may be used to signal back to the PCE 104 whether such p-routes do indeed satisfy the corresponding SLA requirements. Further, through this monitoring, the SLA assessment and computation sub-system 204 may update the training data used to dynamically train and update the machine learning algorithm or artificial intelligence implemented to generate time-series forecasts used by the PCE 104 to compute these p-routes.

Figure 3:
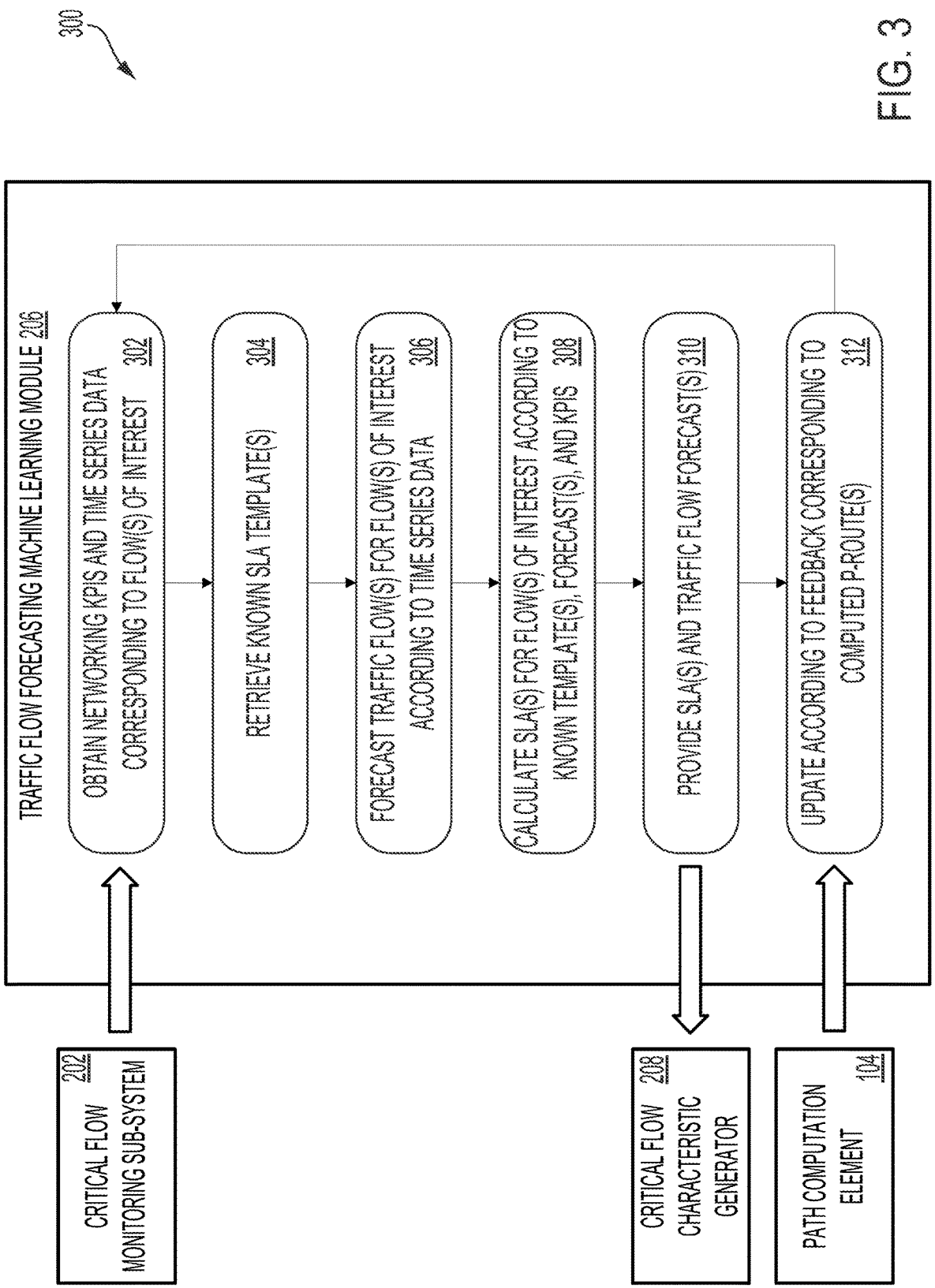
FIG. 3 shows an illustrative example of an environment in which a traffic flow forecasting machine learning module dynamically calculates SLAs for different flows of interest and corresponding traffic flow forecasts in accordance with at least one embodiment.

FIG. 3 shows an illustrative example of an environment 300 in which a traffic flow forecasting machine learning module 206 dynamically calculates SLAs for different flows of interest and corresponding traffic flow forecasts in accordance with at least one embodiment. In the environment 300, the traffic flow forecasting machine learning module 206, through a machine learning algorithm or artificial intelligence implemented therein, may execute a dynamic process to generate network traffic flow forecasts and overall SLAs for different critical flows or other flows of interest. As noted above, the traffic flow forecasting machine learning module 206 may implement a machine learning algorithm or artificial intelligence that is dynamically trained to generate these network traffic flow forecasts for identified critical flows or other flows of interest.

At step 302, the traffic flow forecasting machine learning module 206 may obtain networking KPIs and time-series data corresponding to critical flows or other flows of interest identified by the critical flow monitoring sub-system 202. For instance, as the critical flow monitoring sub-system 202 identifies the network traffic patterns corresponding to different critical flows or other flows of interest, the critical flow monitoring sub-system 202 may provide these network traffic patterns (e.g., time-series data, etc.) for the identified critical flows or other flows of interest to the traffic flow forecasting machine learning module 206.

In response to obtaining these network traffic patterns for the identified critical flows or other flows of interest, the traffic flow forecasting machine learning module 206, at step 304, may retrieve known SLA templates for the LLN. These known SLA templates may be used to assess the SLAs for each of the critical flows or other flows of interest according to pre-defined thresholds on the networking KPIs. For instance, the traffic flow forecasting machine learning module 206 may use the obtained statistical data to calculate the KPIs and, based on these KPIs, compute the overall SLAs for the identified critical flows or other flows of interest, as described in greater detail herein.

At step 306, the traffic flow forecasting machine learning module 206 may forecast the network traffic flows for the critical flows or other flows of interest according to the received time-series data for these flows. As noted above, the machine learning algorithm or artificial intelligence implemented by the traffic flow forecasting machine learning module 206 is dynamically trained using a training dataset comprising historical time series data for different network flows, hypothetical time series data for different network flows, or a combination thereof. The training dataset may further include, for each set of time series data, the known subsequent result (e.g., later time series data for the subject flow) that may serve as the ground truth for any forecasts generated by the machine learning algorithm or artificial intelligence. Based on this training, the machine learning algorithm or artificial intelligence implemented by the traffic flow forecasting machine learning module 206 may generate network traffic flow time-series forecasts for the different critical flows or other flows of interest in the LLN.

At step 308, the traffic flow forecasting machine learning module 206 may calculate the overall SLAs for the critical flows or flows of interest according to the known SLA templates identified by the traffic flow forecasting machine learning module 206, the generated network traffic flows for these critical flows or other flows of interest, and the corresponding KPIs. The traffic flow forecasting machine learning module 206, at step 310, provide these overall SLAs and the computed network traffic flow forecasts for the identified critical flows or other flows of interest to the critical flow characteristic generator 208. As noted above, the critical flow characteristic generator 208 may use these time-series forecasts and/or the overall SLA for each critical flow or other flow of interest to define a critical flow characteristic for each of these critical flows or other flows of interest. The critical flow characteristic generator 208 may provide the critical flow characteristic for a particular critical flow or other flow of interest to the PCE 104 to allow the PCE 104 to compute a p-route for the critical flow or other flow of interest that would satisfy the corresponding SLA for this critical flow or other flow of interest. As noted above, in response to obtaining this critical flow characteristic, the PCE 104 may perform a trial-and-error process whereby the PCE 104 may attempt to find a better path for the critical flow or other flow of interest according to the provided time-series forecast (as defined through the critical flow characteristic). The PCE 104 may forecast the network resources required for the critical flow or other flow of interest. This forecast may be used to identify a p-route that would satisfy the PCE flow requirements for the critical flow or flow of interest.

At step 312, the traffic flow forecasting machine learning module 206 may update the machine learning algorithm or artificial intelligence implemented to calculate the overall SLAs and network traffic flow forecasts for different critical flows or other flows of interest according to feedback corresponding to p-routes computed using these overall SLAs and network traffic flow forecasts. For instance, the traffic flow forecasting machine learning module 206 may update the machine learning algorithm or artificial intelligence as new time-series data is obtained from the critical flow monitoring sub-system 202 for these critical flows or other flows of interest. The traffic flow forecasting machine learning module 206 may evaluate this new time-series data as it is received from the critical flow monitoring sub-system 202 against any previously generated traffic flow forecasts corresponding to the relevant time periods to determine the accuracy of these forecasts generated by the traffic flow forecasting machine learning module 206 using the machine learning algorithm or artificial intelligence. Based on this evaluation, the traffic flow forecasting machine learning module 206 may update the training dataset and, through the traffic flow forecasting machine learning module 206, use this training dataset to improve the accuracy of the machine learning algorithm or artificial intelligence in generating network traffic time-series forecasts. In some instances, the traffic flow forecasting machine learning module 206 may monitor the SLA for each of these critical flows or other flows of interest following the time-based p-routes computed by the PCE 104 in order to determine whether these p-routes satisfy the corresponding SLA requirements. This monitoring may be used to signal back to the PCE 104 whether such p-routes do indeed satisfy the corresponding SLA requirements. Further, through this monitoring, the traffic flow forecasting machine learning module 206 may update the training data used to dynamically train and update the machine learning algorithm or artificial intelligence implemented to generate time-series forecasts used by the PCE 104 to compute these p-routes.

Figure 4:
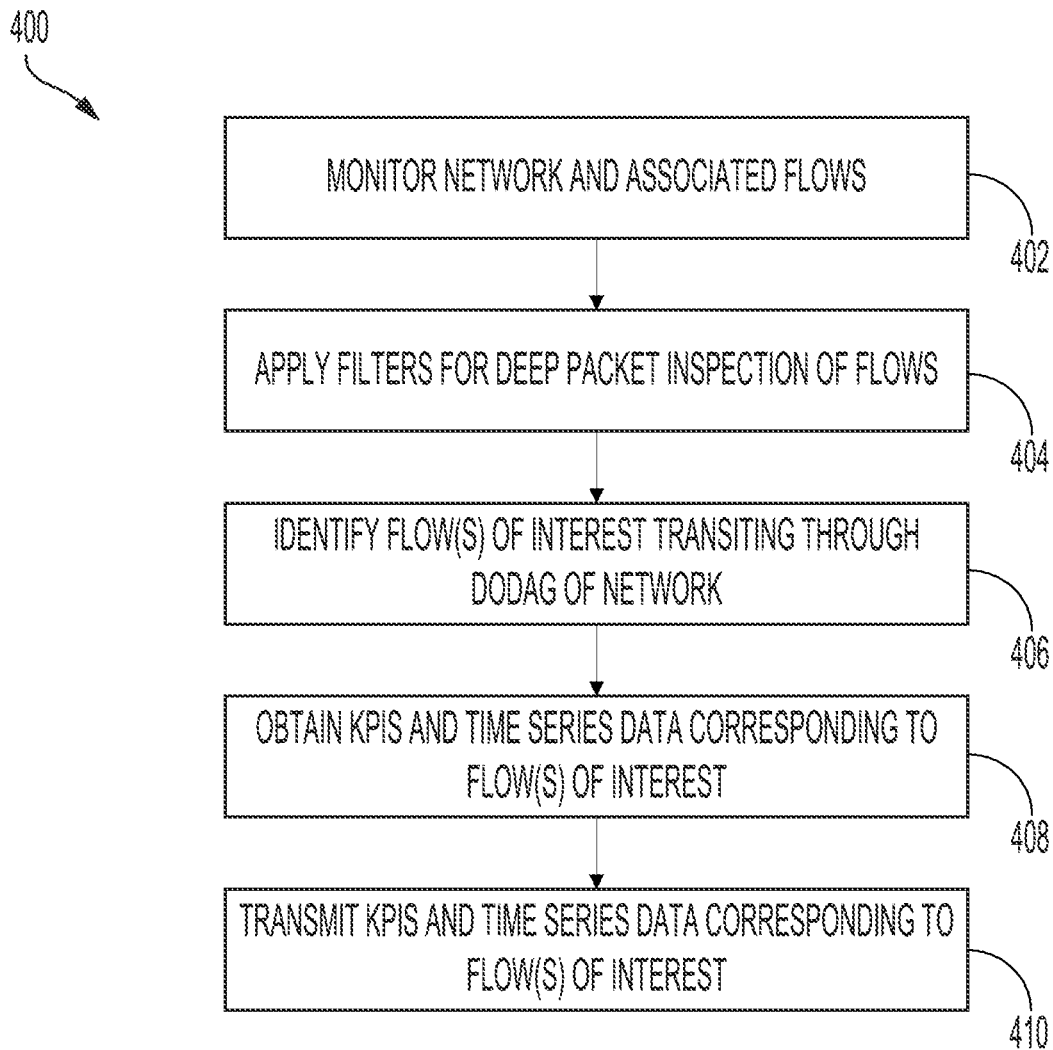
FIG. 4 shows an illustrative example of a process for obtaining key performance indicators (KPIs) and time series data corresponding to one or more flows of interest based on monitoring of critical flows within a LLN in accordance with at least one embodiment.

FIG. 4 shows an illustrative example of a process 400 for obtaining KPIs and time series data corresponding to one or more flows of interest based on monitoring of critical flows within a LLN in accordance with at least one embodiment.

The process 400 may be performed by the critical flow monitoring sub-system implemented by the critical flow detection system. At step 402, the critical flow detection system may monitor the LLN and associated network traffic flows therein. For instance, the critical flow detection system may monitor different data packets as these data packets transit through different nodes (e.g., LLN routers and endpoints) within the network.

At step 404, the critical flow detection system may apply a set of filters within the network to perform DPI of the data packets transiting within the network along different network traffic flows. For instance, the critical flow detection system may implement a set of filters along the DODAG of the LLN to perform DPI of data packets transiting the LLN through different nodes within the LLN. Through the implementation of this set of filters along the DODAG, the critical flow monitoring sub-system may collect statistical data corresponding to different network traffic flows within the LLN. In an embodiment, the critical flow monitoring sub-system may dynamically process this statistical data to identify, at step 406, any network traffic patterns within the LLN that may be used to identify any critical flows or other flows of interest that may be evaluated further to generate p-routes for the LLN.

At step 408, once the critical flow detection system has identified one or more critical flows or other flows of interest for which p-routes may be generated, the critical flow detection system may obtain the relevant KPIs and network traffic flow time-series data corresponding to these one or more critical flows or other flows of interest. For instance, the critical flow detection system may use the collected statistical data (e.g., KPIs and network traffic flow time-series data) to dynamically identify any network traffic patterns within the LLN for the critical flows or other flows of interest for which p-routes may be defined. At step 410, the critical flow detection system may transmit these KPIs, network traffic flow time series data, and any identified network traffic patterns corresponding to the identified critical flows or other flows of interest to the SLA assessment and computation sub-system. As noted above, the SLA assessment and computation sub-system may use these KPIs, network traffic flow time series data, and any identified network traffic patterns to compute the overall SLAs for the identified critical flows or other flows of interest. Further, these KPIs, network traffic flow time series data, and any identified network traffic patterns may be used by the SLA assessment and computation sub-system to dynamically generate network traffic flow time-series forecasts for the identified critical flows or other flows of interest.

Figure 5:
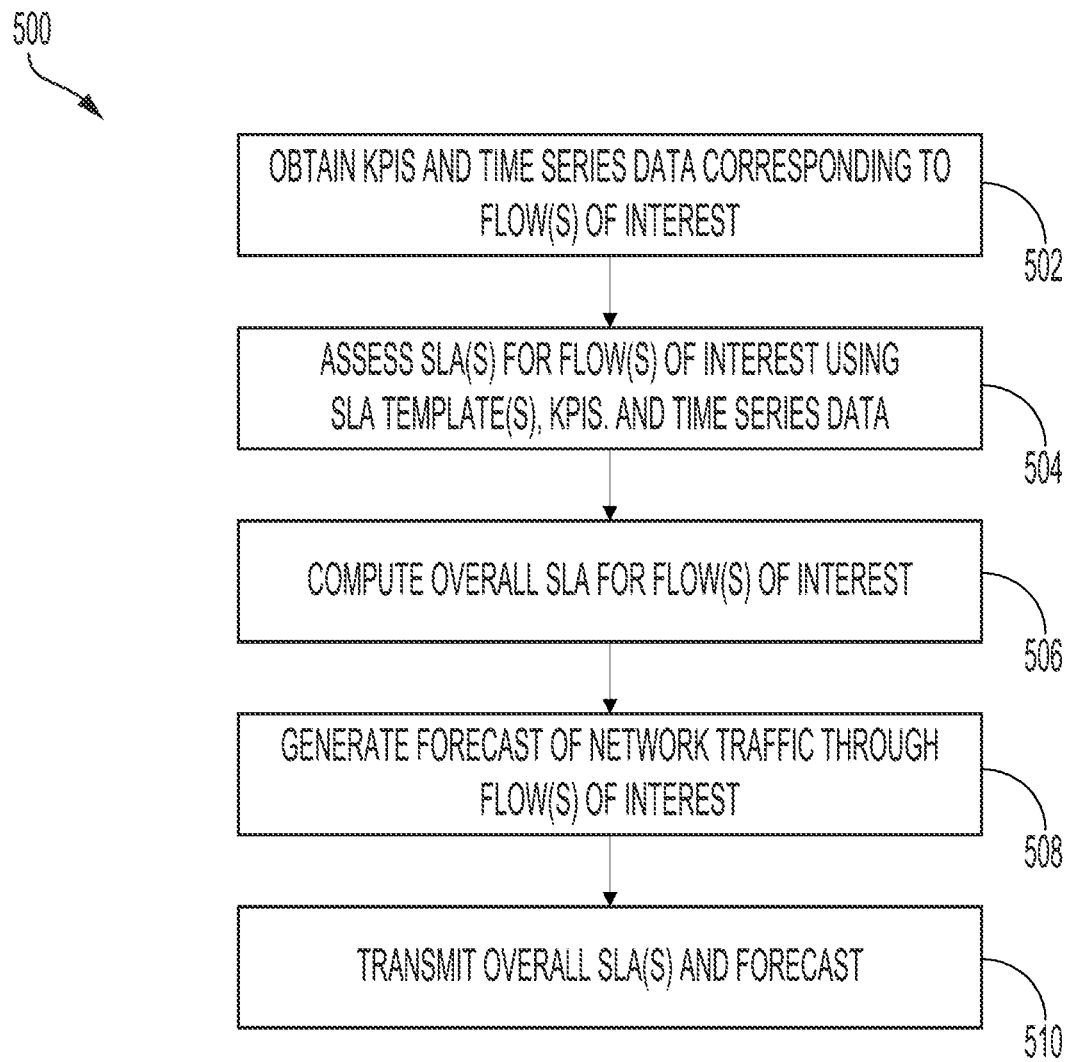
FIG. 5 shows an illustrative example of a process for computing overall SLAs and flow forecasts for identified flows of interest in accordance with at least one embodiment.

FIG. 5 shows an illustrative example of a process 500 for computing overall SLAs and flow forecasts for identified flows of interest in accordance with at least one embodiment. The process 500 may be performed by the aforementioned SLA assessment and computation sub-system implemented by the critical flow detection system. At step 502, the SLA assessment and computation sub-system may obtain the relevant KPIs, network traffic flow time-series data, and any identified network traffic flow patterns associated with a set of identified critical flows or other flows of interest. As noted above, the critical flow detection system may implement a critical flow monitoring sub-system, which may apply a set of filters to the LLN to perform DPI of data packets transiting through the LLN to generate statistical data corresponding to different network traffic flows within the LLN. Using this statistical data, the critical flow detection system may identify a set of critical flows or other flows of interest and calculate the KPIs and network traffic flow time-series data for this set of critical flows or other flows of interest, as well as identify any network traffic flow patterns for these critical flows or other flows of interest. The critical flow detection system, as described above in connection with FIG. 4, may transmit this data to the SLA assessment and computation sub-system.

At step 504, the SLA assessment and computation sub-system may assess the SLAs for the identified set of critical flows or other flows of interest using known SLA templates associated with the LLN, the obtained KPIs, and the obtained time-series data (including the corresponding network traffic flow patterns). For instance, the SLA assessment and computation sub-system may retrieve and use known SLA templates for the LLN to assess these SLAs according to pre-defined thresholds on networking KPIs. The SLA assessment and computation sub-system may, for instance, use the obtained statistical data to calculate the KPIs and, based on these KPIs, compute the overall SLAs for the identified critical flows or other flows of interest at step 506.

At step 508, the SLA assessment and computation sub-system may generate network traffic flow time-series forecasts for the identified critical flows or other flows of interest. As noted above, the SLA assessment and computation sub-system, through a traffic flow forecasting machine learning module, may implement a machine learning algorithm or artificial intelligence that is dynamically trained to generate network traffic flow time-series forecasts based on provided statistical data corresponding to the identified critical flows or other flows of interest. The machine learning algorithm or artificial intelligence may include an ARIMA model that is trained using a training dataset comprising historical time series data for different network flows, hypothetical time series data for different network flows, or a combination thereof. The training dataset may further include, for each set of time series data, the known subsequent result (e.g., later time series data for the subject flow) that may serve as the ground truth for any forecasts generated by the ARIMA model. Through this processing of the training dataset, the ARIMA model may be evaluated to determine whether the generated forecasts comport with the known results corresponding to the training dataset. Based on this evaluation, the SLA assessment and computation sub-system may dynamically update the ARIMA model to improve the accuracy of the ARIMA model in generating forecasts given statistical data, network traffic flow patterns, and other time-series data corresponding to critical flows and other flows of interest.

At step 510, the SLA assessment and computation sub-system may transmit the overall SLAs and forecasts for the identified set of critical flows or other flows of interest to a critical flow characteristic generator implemented by the critical flow detection system. As noted above, the critical flow characteristic generator may use these time-series forecasts and/or the overall SLA for each critical flow or other flow of interest to define a critical flow characteristic for each of these critical flows or other flows of interest. The critical flow characteristic generator may provide the critical flow characteristic for a particular critical flow or other flow of interest to the PCE to allow the PCE to compute a p-route for the critical flow or other flow of interest that would satisfy the corresponding SLA for this critical flow or other flow of interest.

Figure 6:
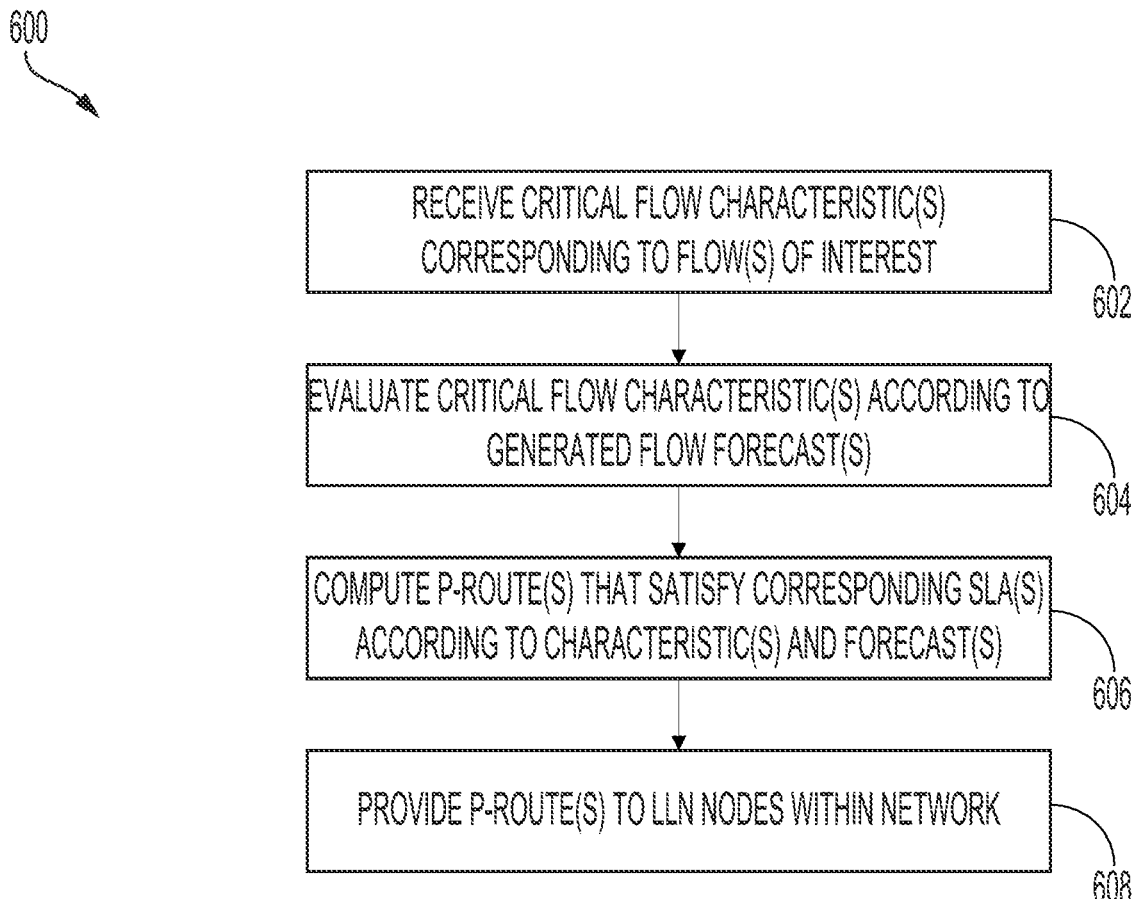
FIG. 6 shows an illustrative example of a process for computing p-routes for a LLN based on critical flow characteristics and flow forecasts for a set of flows of interest in accordance with at least one embodiment.

FIG. 6 shows an illustrative example of a process 600 for computing p-routes for a LLN based on critical flow characteristics and flow forecasts for a set of flows of interest in accordance with at least one embodiment. The process 600 may be performed by a PCE implemented for an active LLN. At step 602, the PCE may receive critical flow characteristics corresponding to one or more critical flows or other flows of interest. The critical flow characteristics corresponding to these one or more critical flows or other flows of interest may include the SLAs associated with these critical flows or other flows of interest, the network traffic flow time-series forecasts for these flows, and the data obtained through monitoring of these critical flows or other flows of interest. The critical flow characteristics may be obtained from the critical flow characteristic generator described above.

At step 604, the PCE may evaluate the critical flow characteristics for these critical flows or other flows of interest according to the generated forecasts to compute, at step 606, a set of p-routes that satisfy the SLAs corresponding to the critical flows or other flows of interest. For instance, the PCE may perform a trial-and-error process whereby the PCE may attempt to find a better path for the critical flow or other flow of interest according to the provided time-series forecast (as defined through the critical flow characteristic). In some examples, the PCE can forecast the network resources required for each critical flow or other flow of interest. This forecast may be used to identify a p-route that would satisfy the PCE flow requirements for each critical flow or flow of interest. In an embodiment, the PCE implements a machine learning algorithm or artificial intelligence to predict the network resources required for each critical flow or other flow of interest and, based on this prediction, compute p-routes for the critical flow or other flow of interest. The p-routes computed by the PCE may be time-based according to the schedule defined by the PCE based on the received critical flow characteristics for each critical flow or other flow of interest.

At step 608, the PCE may provide the computed p-routes to the relevant LLN nodes within the network. For instance, the p-routes may be provided to these LLN nodes according to the PCE. Alternatively, these p-routes may be pre-loaded on all LLN nodes within the network. As noted above, time-series data for different critical flows and other flows of interest may be continuously evaluated to determine whether the machine learning algorithm or artificial intelligence implemented by the aforementioned critical flow detection system has accurately forecast the network traffic flows over time for these different critical flows and other flows of interest. For example, in an embodiment, the critical flow detection system can monitor the SLA for each of these critical flows or other flows of interest following the time-based p-routes computed by the PCE in order to determine whether these p-routes satisfy the corresponding SLA requirements. This monitoring may be used to signal back to the PCE whether such p-routes do indeed satisfy the corresponding SLA requirements. Further, through this monitoring, the critical flow detection system may update the training data used to dynamically train and update the machine learning algorithm or artificial intelligence implemented to generate time-series forecasts used by the PCE to compute these p-routes.

FIG. 7 illustrates an example network device 700 suitable for performing switching, routing, and other networking operations in accordance with some implementations. Network device 700 includes a CPU 704, interfaces 702, and a connection 710 (e.g., a Peripheral Component Interconnect (PCI) bus). When acting under the control of appropriate software or firmware, the CPU 704 is responsible for executing packet management, error detection, and/or routing functions. The CPU 704 can accomplish these functions under the control of software including an operating system and any appropriate applications software. The CPU 704 may include one or more processors 708, such as a processor from the Intel® X98 family of microprocessors. In some cases, the processor 708 can be specially designed hardware for controlling the operations of network device 700. In some cases, a memory 706 (e.g., non-volatile RAM, ROM, etc.) also forms part of the CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as fast token ring interfaces, wireless interfaces, Ethernet interfaces, Gigabit Ethernet interfaces, Asynchronous Transfer Mode (ATM) interfaces, High-Speed Serial Interface (HSSI) interfaces, Packet Over SONET/SDH (POS) interfaces, Fiber Distributed Data Interface (FDDI) interfaces, WiFi interfaces, 3G/4G/5G cellular interfaces, Controller Area Network (CAN) bus, Long Range (LoRa), and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC) 712, which can be configured to perform routing and/or switching operations. The ASIC 712 can communicate with other components in the network device 700 via the connection 710, to exchange data and signals and coordinate various types of operations by the network device 700, such as routing, switching, and/or data storage operations, for example.

FIG. 8 illustrates a computing system architecture 800 including various components in electrical communication with each other using a connection 806, such as a bus, in accordance with some implementations. Example system architecture 800 includes a processing unit (CPU or processor) 804 and a system connection 806 that couples various system components including the system memory 820, such as ROM 818 and RAM 816, to the processor 804. The system architecture 800 can include a cache 802 of high-speed memory connected directly with, in close proximity to, or integrated as part of the processor 804. The system architecture 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions.

Other system memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system architecture 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system architecture 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, RAMs 816, ROM 818, and hybrids thereof.

The storage device 808 can include services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:
1. A computer-implemented method comprising:
monitoring a set of critical flows within a set of nodes, wherein the set of nodes are organized along a destination-oriented, directed, acyclic graph (DODAG), and wherein the set of critical flows are used to identify a flow of interest transiting through the DODAG;
assessing a service-level agreement (SLA) corresponding to the flow of interest, wherein the SLA is assessed based on networking key performance indicators (KPIs);

generating, via a machine learning algorithm, a forecast of a traffic flow corresponding to the flow of interest, wherein the forecast of the traffic flow and the SLA are used to define a critical flow characteristic corresponding to the flow of interest, and wherein the machine learning algorithm is trained using a dataset of sample critical flows, sample forecasts corresponding to the sample critical flows, and sample p-routes; and providing the critical flow characteristic, wherein when the critical flow characteristic is used by a Path Computation Element (PCE) associated with the set of nodes, the PCE uses the critical flow characteristic to compute a p-route through the set of nodes that satisfies the SLA for the flow of interest.

2. The computer-implemented method of claim 1, further comprising:

monitoring the p-route to generate a determination corresponding to whether the p-route satisfies the SLA for the flow of interest; and providing feedback with regard to the p-route based on the determination.

3. The computer-implemented method of claim 1, further comprising:

applying a set of filters along the DODAG to perform deep packet inspection (DPI), wherein the DPI is performed to identify the flow of interest.

4. The computer-implemented method of claim 1, wherein the KPIs include a maximum delay and an end-to-end loss amongst the set of nodes.

5. The computer-implemented method of claim 1, wherein the p-route is time-based according to a schedule, and wherein the schedule is computed according to the critical flow characteristic.

6. The computer-implemented method of claim 1, wherein the SLA is further assessed using a set of SLA templates based on one or more thresholds corresponding to the networking KPIs.

7. A system, comprising:

one or more processors; and memory storing thereon instructions that, as a result of being executed by the one or more processors, cause the system to:

monitor a set of critical flows within a set of nodes, wherein the set of nodes are organized along a destination-oriented, directed, acyclic graph (DODAG), and wherein the set of critical flows are used to identify a flow of interest transiting through the DODAG;

assess a service-level agreement (SLA) corresponding to the flow of interest, wherein the SLA is assessed based on networking key performance indicators (KPIs);

generate, via a machine learning algorithm, a forecast of a traffic flow corresponding to the flow of interest, wherein the forecast of the traffic flow and the SLA are used to define a critical flow characteristic corresponding to the flow of interest, and wherein the machine learning algorithm is trained using a dataset of sample critical flows, sample forecasts corresponding to the sample critical flows, and sample p-routes; and provide the critical flow characteristic, wherein when the critical flow characteristic is used by a Path Computation Element (PCE) associated with the set of nodes, the PCE uses the critical flow characteristic to compute a p-route through the set of nodes that satisfies the SLA for the flow of interest.

8. The system of claim 7, wherein the instructions further cause the system to:

monitor the p-route to generate a determination corresponding to whether the p-route satisfies the SLA for the flow of interest; and provide feedback with regard to the p-route based on the determination.

9. The system of claim 7, wherein the instructions further cause the system to:

apply a set of filters along the DODAG to perform deep packet inspection (DPI), wherein the DPI is performed to identify the flow of interest.

10. The system of claim 7, wherein the KPIs include a maximum delay and an end-to-end loss amongst the set of nodes.

11. The system of claim 7, wherein the p-route is time-based according to a schedule, and wherein the schedule is computed according to the critical flow characteristic.

12. The system of claim 7, wherein the SLA is further assessed using a set of SLA templates based on one or more thresholds corresponding to the networking KPIs.

13. A non-transitory, computer-readable storage medium storing thereon executable instructions that, as a result of being executed by one or more processors of a computer system, cause the computer system to:

monitor a set of critical flows within a set of nodes, wherein the set of nodes are organized along a destination-oriented, directed, acyclic graph (DODAG), and wherein the set of critical flows are used to identify a flow of interest transiting through the DODAG;

assess a service-level agreement (SLA) corresponding to the flow of interest, wherein the SLA is assessed based on networking key performance indicators (KPIs);

generate, via a machine learning algorithm, a forecast of a traffic flow corresponding to the flow of interest, wherein the forecast of the traffic flow and the SLA are used to define a critical flow characteristic corresponding to the flow of interest, and wherein the machine learning algorithm is trained using a dataset of sample critical flows, sample forecasts corresponding to the sample critical flows, and sample p-routes; and provide the critical flow characteristic, wherein when the critical flow characteristic is used by a Path Computation Element (PCE) associated with the set of nodes, the PCE uses the critical flow characteristic to compute a p-route through the set of nodes that satisfies the SLA for the flow of interest.

14. The non-transitory, computer-readable storage medium of claim 13, wherein the executable instructions further cause the computer system to:

monitor the p-route to generate a determination corresponding to whether the p-route satisfies the SLA for the flow of interest; and provide feedback with regard to the p-route based on the determination.

15. The non-transitory, computer-readable storage medium of claim 13, wherein the executable instructions further cause the computer system to:

apply a set of filters along the DODAG to perform deep packet inspection (DPI), wherein the DPI is performed to identify the flow of interest.

16. The non-transitory, computer-readable storage medium of claim 13, wherein the p-route is time-based according to a schedule, and wherein the schedule is computed according to the critical flow characteristic.

17. The non-transitory, computer-readable storage medium of claim 13, wherein the SLA is further assessed using a set of SLA templates based on one or more thresholds corresponding to the networking KPIs.

18. The non-transitory, computer-readable storage medium of claim 13, wherein the KPIs include a maximum delay and an end-to-end loss amongst the set of nodes.

* * * * *